United States Patent [19]
Saidi et al.

[11] Patent Number: 5,976,489
[45] Date of Patent: *Nov. 2, 1999

[54] METHOD FOR PREPARING LITHIUM MANGANESE OXIDE COMPOUNDS

[75] Inventors: M. Yazid Saidi; Eileen Saidi; Arnold Stux, all of Henderson, Nev.

[73] Assignee: Valence Technology, Inc., Henderson, Nev.

[*] Notice: This patent is subject to a terminal disclaimer.

[21] Appl. No.: 08/807,615

[22] Filed: Feb. 27, 1997

Related U.S. Application Data

[63] Continuation-in-part of application No. 08/630,303, Apr. 10, 1996, Pat. No. 5,770,018.

[51] Int. Cl.$^6$ ............................ C01G 45/12; H01M 4/50
[52] U.S. Cl. ............................................ 423/599; 429/224
[58] Field of Search .............................. 423/599; 429/224

[56] References Cited

U.S. PATENT DOCUMENTS

| | | | |
|---|---|---|---|
| 4,023,961 | 5/1977 | Douglas et al. | 423/593 |
| 4,246,253 | 1/1981 | Hunter | 423/605 |
| 4,567,031 | 1/1986 | Riley | 423/599 |
| 4,828,834 | 5/1989 | Nagaura et al. | 429/194 |
| 5,135,732 | 8/1992 | Barboux et al. | 423/593 |
| 5,147,739 | 9/1992 | Beard | 429/194 |
| 5,196,279 | 3/1993 | Tarascon | 429/194 |
| 5,326,545 | 7/1994 | Koksbang et al. | 423/62 |
| 5,334,334 | 8/1994 | Koksbang | 264/28 |
| 5,418,090 | 5/1995 | Koksbang et al. | 429/224 |
| 5,425,932 | 6/1995 | Tarascon | 423/599 |
| 5,589,300 | 12/1996 | Fauteux et al. | 429/224 |
| 5,742,070 | 4/1998 | Hayashi et al. | 423/599 |
| 5,770,018 | 6/1998 | Saidi | 423/599 |

FOREIGN PATENT DOCUMENTS 60-225358   9/1985   Japan .

OTHER PUBLICATIONS

International Search Report for PCT/US 98/02039, no date.
Derwent XP002065259 Abstract, Mar. 28, 1994.
J.M. Tarascon, E. Wang, F.K. Shokoohi, W.R. McKinnon, and S. Colson, "The Spinel Phase of LiMn$_2$O$_4$ as a Cathode in Secondary Lithium Cells", J. Electrochem. Soc., vol. 138, No. 10, 2859–2864, Oct. 1991.
J.M. Tarascon and D. Guyomard, "Li Metal–Free Rechargeable Batteries Based on Li$_{1+x}$Mn$_2$O$_4$ Cathodes ($0 \leq x \leq 1$) and Carbon Anodes", J. Electrochem. Soc., vol. 138, No. 10, 2864–2868, Oct. 1991.
J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994, no month.
R.J. Gummow, A. deKock, M.M. Thackeray, "Improved Capacity Retention in Rechareable 4 V Lithium/Lithium–Manganese Oxide (Spinel) Cells", Solid State Ionics, vol. 69, 1994, no month.
H. Huang and P.G. Bruce, "A 3 Volt Lithium Manganese Oxide Cathode for Rechargeable Lithium Batteries", J. Electrochem. Soc., vol. 141, No. 7, Jul. 1994.

*Primary Examiner*—Steven Bos
*Attorney, Agent, or Firm*—Young & Basile, P.C.

[57] ABSTRACT

A method of making a lithium manganese oxide intercalation compound in powder form comprises forming a solution of a manganese compound and a lithium compound in a solvent; and spray-drying the solution by atomizing the solution to form droplets thereof and contacting the droplets with a stream of non-oxidizing hot gas at a first elevated temperature to evaporate at least a major portion by weight of the solvent present in the solution thereby providing a precursor powder. The precursor powder is heated at a second elevated temperature which is below the melting point of the lithium manganese oxide compound. The second temperature is sufficient to cause reaction among constituents in the precursor powder thereby providing the lithium manganese oxide compound having a spinel unit structure.

13 Claims, 3 Drawing Sheets

METHOD FOR PREPARING LITHIUM MANGANESE OXIDE COMPOUNDS

CROSS-REFERENCE TO RELATED APPLICATION

This application is a continuation-in-part of U.S. application Ser. No. 08/630,303 filed Apr. 10, 1996, now U.S. Pat. No. 5,770,018.

FIELD OF THE INVENTION

This invention relates to electrochemical batteries, improved positive electrode material, and to a method of making active material through a new process of synthesis.

BACKGROUND OF THE INVENTION

Lithium batteries are prepared from one or more lithium electrochemical cells. Such cells have included an anode (negative electrode) of metallic lithium, a cathode (positive electrode) typically a transition metal chalcogenide, and an electrolyte interposed between electrically insulated, spaced apart, positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

Lithium manganese oxide represented by the nominal general formula $LiMn_2O_4$ is known to be an intercalation compound usable as a cathode material in a lithium battery. This material has been used as a positive electrode for batteries comprising lithium metal anodes as well as a positive cathode lithium source for lithium ion batteries, for example, comprising intercalation carbon electrodes as anodes.

Methods of synthesis for $LiMn_2O_4$ compounds are known and are reactions generally between stoichiometry quantities of a lithium containing compound and a manganese containing compound, exemplified by a lithium salt and manganese oxide. Common precursors are, for example, lithium salt and $MnO_2$ compounds as disclosed by Hunter in U.S. Pat. No. 4,246,253. In U.S. Pat. No. 4,828,834 Nagaura et al. attempted to prepare lithium manganese oxide materials by sintering precursor lithium salt and $MnO_2$ materials. However, Nagaura's nominal $LiMn_2O_4$ compounds were not fully crystallized spinel electrodes and suffered from very low capacity. The methods described by Hunter and Nagaura require a heating time of from about 10 to about 50 hours at temperatures ranging from about 500° C. to about 900° C. Accordingly, present methods for forming lithium manganese oxide, nominally, $LiMn_2O_4$, pose significant barriers due to the severe penalty of time, controlled process conditions, and other features which do not permit adaptability to automated commercial production.

SUMMARY OF THE INVENTION

The present invention provides a method of preparing a lithium manganese oxide (LMO) intercalation compound which includes a specific step for preparing a precursor where the characteristics of the precursor permit formation of the final compound at relatively low temperature and relatively rapidly compared to present known methods which require very high temperature and long processing time. The product LMO intercalation compound has a spinel unit structure and is represented by the nominal general formula $Li_xMn_aO_b$ where x is between 0 and 2, preferably, x is 0.9 to 1.1, a is 1.9 to 2.1, and b is 3.9 to 4.1. The above variations occur for a spinel lithium manganese oxide (LMO) compound referred to herein as nominally $LiMn_2O_4$.

The basic method of the invention comprises an initial step of forming a solution comprising a manganese compound and a lithium compound in a solvent. The solution is dried, preferably spray-dried, by atomizing the solution to form droplets thereof, and contacting the droplets with a stream of non-oxidizing hot gas at a temperature to evaporate at least a major portion, by weight, of the solvent originally in the solution. The spray-drying step provides a precursor powder comprising intermingled particles of the manganese compound and the lithium compound. This precursor powder is heated at an elevated temperature sufficient to cause reaction among the particles of the precursor powder, thereby providing the LMO product having the spinel unit structure. The elevated temperature is sufficient to cause diffusion of one or more of lithium, manganese, and oxygen elements across particle boundaries to provide the LMO spinel. The elevated temperature is below the melting point of the product compound. The reaction is a solid phase reaction, beginning with precursors in powder form and produces a solid LMO spinel product.

In the initial step, it is preferred to use an aqueous solution comprising a lithium compound and a manganese compound in proportion to one another based on the product spinel. This is a stoichiometric atomic ratio of approximately 1 to 2 of lithium to manganese. It is preferred that the aqueous solution containing the lithium and manganese compounds have a pH in the range of relatively neutral to basic. The lithium compound is desirably selected from the group consisting of lithium acetate ($LiCH_3COO$), lithium hydroxide (LiOH), lithium carbonate ($Li_2CO_3$), and lithium nitrate ($LiNO_3$). The manganese compound is desirably selected from the group consisting of manganese acetate ($Mn(CH_3COO)_2$), manganese hydroxide ($Mn(OH)_2$), manganese nitrate ($Mn(NO_3)_2$), and manganese carbonate ($MnCO_3$). Preferred compounds are manganese hydroxide, manganese acetate, lithium acetate, and lithium nitrate. It is preferred that the spray-drying step be conducted with a hot gas which is inert and preferably selected from the group consisting of nitrogen and argon. By inert, it is meant that the hot gas is non-oxidizing with respect to the manganese and the hot gas does not interfere with the chemistry of the precursor compounds ultimately affecting the product of the heating step. It is preferred that the spray-drying be done with the hot gas at a temperature sufficient to vaporize the solvent. When the solvent is water, the temperature is at least 80° C. and preferably at least 100° C. Spray-drying may be effectively conducted with the hot gas inlet temperature of 100° C. to 130° C., and outlet temperature of 90° C. to 150° C.

It is preferred that the product of spray-drying be a finely divided powder having a major portion, desirably over 90 percent by weight and preferably 97 percent by volume of particles with a size of about 5 microns or less. The characteristics of the spray-dried precursor are important to the characteristics of the final product and the efficient execution of the heating step. It is preferred that the precursor powder produced by spray-drying be an air stable, fine, white powder consisting essentially of particles of a manganese compound and a lithium compound having the aforesaid particle size. It is important that the precursor powder be finely divided and not coalesced or clumped.

After drying, the precursor powder is heated to an elevated temperature to react particles of the manganese and lithium precursors. It is preferred that the precursor powder be heated to an elevated reaction temperature of about 300° C. to 450° C. It is most preferred that the elevated reaction temperature be 450° C. The spray-dried powder (precursor powder) is desirably heated at a relatively high rate of approximately 10° C. to 50° C. per minute to cause the reaction. Higher heating rates can also be used on the order of about 100° C. to 200° C. per minute. At a heating rate of 10° C. to 50° C. per minute, the time for heating, after temperature is achieved, is less than an hour and is typically between 10 and 45 minutes. At a heating rate of 50° C. per minute to a temperature of 400° C., the reaction is conducted in as little as 30 minutes.

Advantageously, the ultimate lithium manganese oxide spinel intercalation compound prepared by this method is in the form of a finely divided powder having an optimum particle size distribution. On the order of 97 percent by volume of the particles have a size less than 5 microns. Such powder has a surface area in a range of 4 to 5 square meters per gram, and more particularly about 4.8 square meters per gram. This is in contrast to conventional $LiMn_2O_4$ products which have very low surface area of about 0.8 square meters per gram. The product of the invention has a surface area 4 to 5 times greater than lithium manganese oxide products prepared by conventional means. The higher surface area of the present product leads to improved electrochemical properties. Advantageously, the lithium manganese oxide intercalation compound prepared by the method of the invention, when cycled against a metallic lithium counter-electrode, is characterized by capacity loss of less than 5 percent after 5 cycles, not including the first cycle loss. This performance is very good and untypical of lithium manganese oxide. The product of the invention has been tested and shown to maintain over 90 percent of its capacity after 5 cycles, greater than 95 percent after 5 cycles, and found to maintain as much as 98 percent of its capacity after 5 cycles. Remarkably, the loss is as little as 2 percent to 5 percent after 5 cycles, not including the first cycle loss. The first cycle loss is usually higher than 5 percent.

Objects, features, and advantages of the invention include an improved electrochemical cell or battery based on lithium which has good charging and discharging characteristics, a large discharge capacity, which maintains its integrity over a prolonged life cycle, and which is able to be produced relatively economically, and relatively easily, and rapidly. Another object is to provide a method for forming cathode active material which lends itself to commercial scale production providing for ease of preparing large quantities.

These and other objects, features, and advantages will become apparent from the following description of the preferred embodiments, claims, and accompanying drawings.

DETAILED DESCRIPTION OF THE PREFERRED EMBODIMENTS

Figure 1:
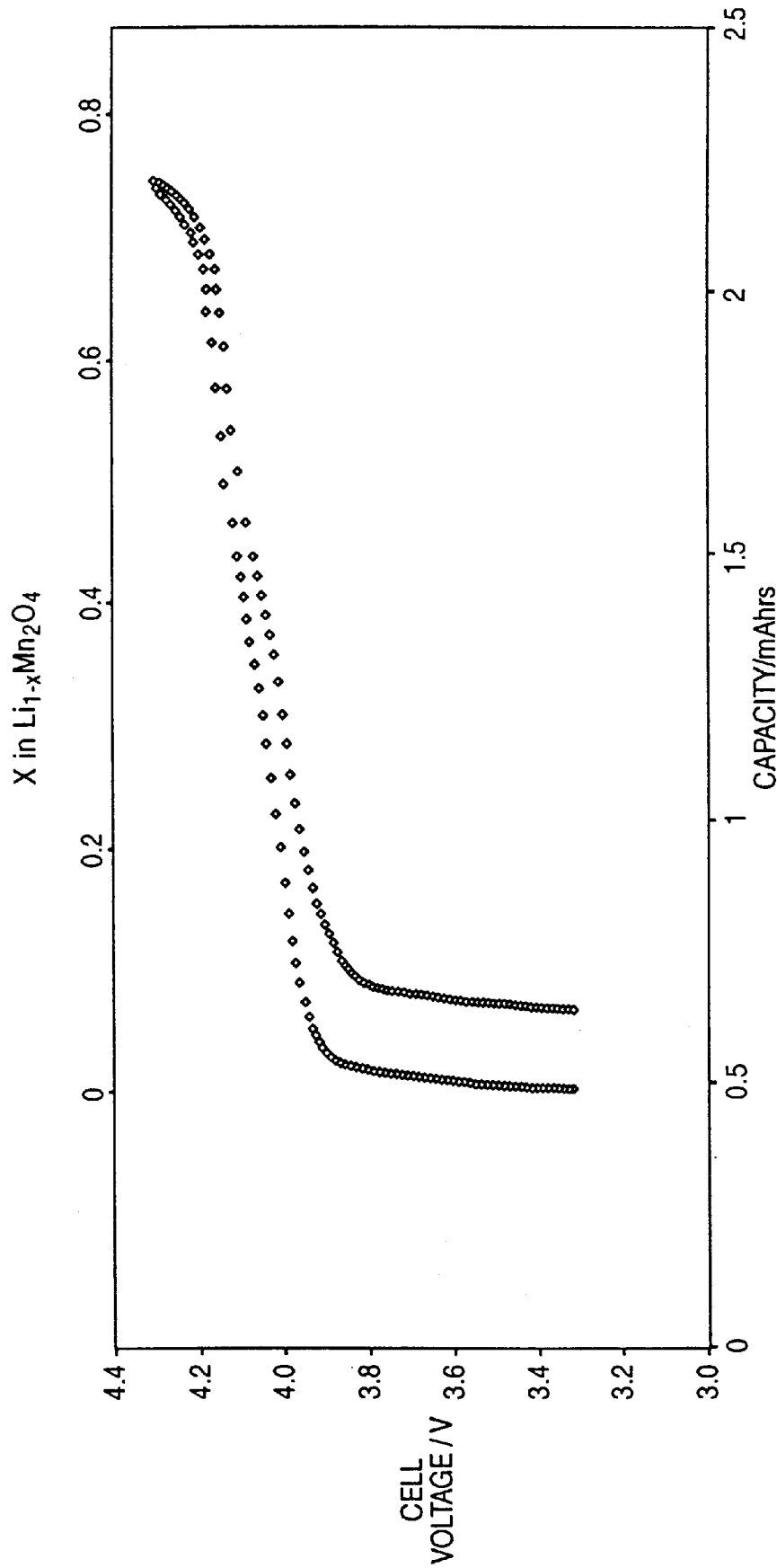
FIG. 1 shows a voltage profile of a test cell, based on the lithium manganese oxide electrode active material prepared according to the invention, and using a lithium metal counter-electrode as described in the Example. The data shown in FIG. 1 is based on the Electrochemical Voltage Spectroscopy (EVS) technique.

The basic method of the invention comprises an initial step of forming a solution comprising a manganese compound and a lithium compound in a solvent. The solution is dried, preferably spray-dried, by atomizing the solution to form droplets thereof, and contacting the droplets with a stream of non-oxidizing hot gas at a temperature to evaporate at least a major portion, by weight, of the solvent originally in the solution. The spray-drying step provides a powder comprising intermingled particles of the manganese compound and the lithium compound. This precursor powder is heated at an elevated temperature sufficient to cause reaction among the particles comprising of the two compounds, thereby providing the lithium manganese oxide product having the spinel unit structure. The reaction occurs among precursor particles of the two compounds.

It is preferred that the precursor manganese compound and the precursor lithium compound each be in particle form and preferably are salts. It is desired that the manganese compound be selected from the group consisting of acetates, hydroxides, carbonates, and nitrates. It is desired the lithium compound be selected from the group consisting of acetates, hydroxides, and nitrates. Lithium carbonate has lesser solubility. It is preferred that the manganese precursor be manganese hydroxide or manganese acetate and that the lithium precursor be lithium nitrate or lithium acetate. The aforesaid precursor compounds are generally crystals, granules, and powders, and are generally referred to as being in particle form. The acetate and nitrate precursors are known to be hygroscopic. Therefore, when measuring out precursor quantities, adjustments may be required to account for retained water in the precursor compounds. The solvent mixture wherein the manganese compound and lithium compound precursor is dissolved and/or suspended, is preferably water. Other solvents to be considered are methanol, acetone, and alkaline solutions. Manganese acetate is soluble in alkaline solutions. Therefore, alkaline solutions could be used as other solvents. It is preferred that the solution containing the lithium compound and the manganese compound be an aqueous solution. It is preferred that the pH be adjusted to a range of 7 to 11. That is, the pH of the solution ranges from relatively neutral to basic (alkaline), although the pH is not thought to be critical.

In a preferred embodiment, at least a portion of the solvent is removed by spray-drying. spray-drying is preferably conducted using pressure nozzles which cause atomization by forcing the wet mixture under pressure at a high degree of spin through a small orifice. The wet mixture is thereby dispersed into fine droplets and dried by a relatively large volume of hot gases sufficient to evaporate the volatile solvent, thereby providing very fine particles of precursor lithium compound and precursor manganese compound intimately and essentially homogeneously mixed. Desirably, the volatile constituent is water, and spray-drying takes place in air, but preferably in an inert hot gas stream. The hot drying gas is preferably argon, or other inert gas. Such inert gas is non-oxidizing and is inert with respect to reaction with precursors and especially manganese. This prevents the oxidation of $Mn^{2+}$ to $Mn^{3+}$. The acetate is a $Mn^{2+}$ based material and the reaction or stoichiometry of the initial mixture is based on that. The temperature of the gas, at the outlet of the dryer, is preferably greater than 90° C. The inlet gas stream is at an elevated temperature sufficient to remove a major portion of the water with a reasonable dryer volume, for a desired rate of dry powder production and particle size. Air inlet temperature, atomized droplet size, and gas flow are factors which may be varied and affect the particle size of the spray-dried product, and the degree of drying. Typically, there is some water or solvent left in the spray-dried material, on the order of about 5 percent to 15 percent by weight water. It is preferred that the drying step reduce the moisture content of the material to less than 10 percent by weight. It depends on the flow rate, residence time of the solvent water particles, and contact with the heated air, and also depends on the temperature of the heated air. Techniques for spray-drying are known and a further description of spray-drying may be found in U.S. Pat. No. 5,326,545 issued to Koksbang et al which is incorporated herein by reference in its entirety.

Freeze-drying is an alternative method for drying the precursor solution to remove at least a portion of the solvent. Freeze-drying is preferably conducted by cooling the solvent mixture to a temperature below the freezing point of the solvent under a vacuum. In one aspect, freeze-drying is conducted under a vacuum and that an absolute pressure of less than 5 millimeters of mercury (mmHg ABS). Preferably, the solvent is water and the temperature at which freeze-drying takes place is at about 0° C. or less. Desirably, the temperature is −10° C. or less, and preferably it is in range of about −10° C. to about −40° C. A suitable range is −20° C. to −30° C. The freeze-drying removes the volatile solvent under vacuum, thereby providing fine particles of the intermingled manganese precursor compound and the lithium precursor compound. The equipment necessary to accomplish freeze-drying depends on the quantity of material being freeze-dried. If a flask is used, the wet mixture may be frozen in the flask in a dry ice methanal bath. The solvent (water) is driven off for a sufficient period of time under vacuum using a vacuum pump. The freeze-drying is conducted preferably until the moisture content is reduced to less than 30 percent by weight and desirably on the order of less than 10 percent by weight or less. After freeze-drying, if it is desired to drive off additional water it is recommended to heat the freeze-dried product to a temperature greater than about 100° C. for a time sufficient to reduce the water content to the desired level. Techniques for freeze-drying are known and are discussed in U.S. Pat. No. 5,334,334 issued to Koksbang which is incorporated by reference herein in its entirety.

After drying, the precursor powder is then heated at an elevated temperature sufficient to cause, desirably, solid state reaction between intermingled particles of the lithium compound and the manganese compound. In this solid state reaction, lithium and optionally other elements of the intermingled precursor compound are transported across particle boundaries whereby at least partial homogenization across such boundaries produces a solid phase product having the spinel unit structure and the nominal general formula $LiMn_2O_4$.

Figure 5:
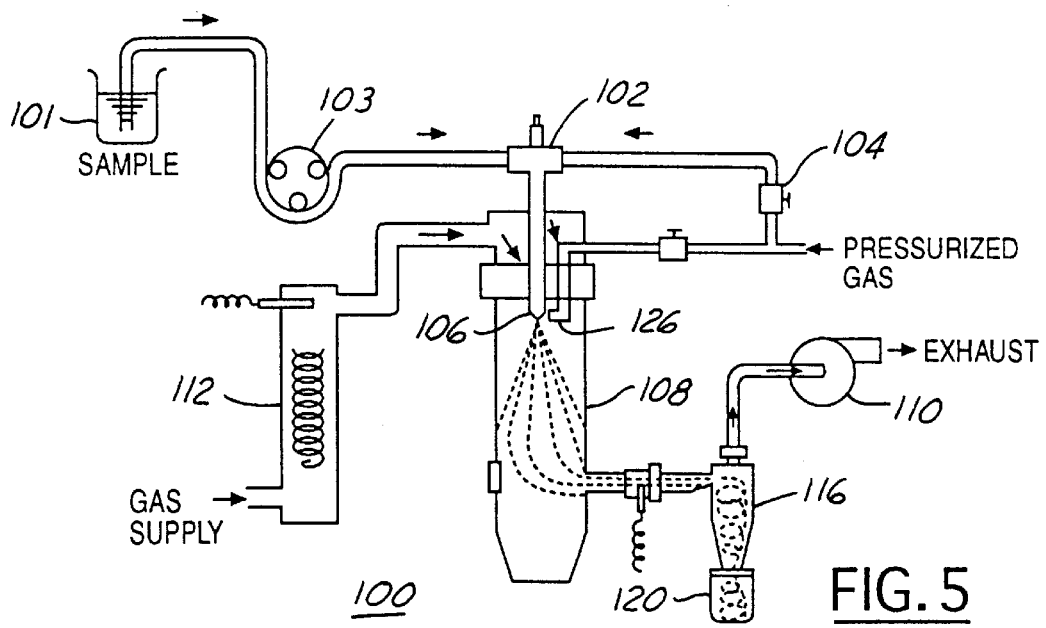
FIG. 5 is a schematic of a spray-drying apparatus.
Figure 6:
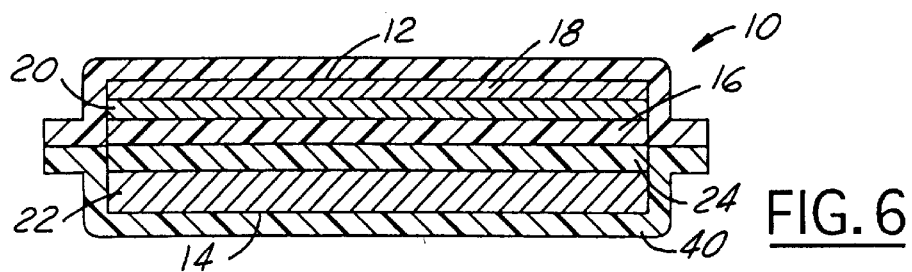
FIG. 6 is an illustration of a cross section of a thin battery or cell embodying the invention.

Positive electrode active materials were prepared and tested electrochemically and the results are reported in FIGS. 1 through 4. The spray-dry apparatus had features as reported in FIG. 5. The test cell configuration will be described with reference to FIG. 6. A description of an electrochemical cell or battery which uses the active material prepared according to the invention will now be provided. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 6, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/ electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, the active material, and carbon powder (particles of carbon). The binder desirably is a polymer. A paste containing the binder, active material, and carbon is coated onto a current collector. The positive electrode comprises the lithium manganese oxide active material of the invention. For the positive electrode, the content is typically as follows: 50 to 90 percent by weight active material; 5 to 30 percent carbon black as the electric conductive diluent; and 3 to 20 percent binder, preferably chosen to enhance ionic conductivity. Stated ranges are not critical. The amount of active material may range from 25 to 85 weight percent. These materials are mixed and blended together with a solvent. Xylene is a suitable solvent. The mixture is then coated onto a current collector to achieve the desired thickness for the final electrode. The negative electrode of the invention preferably comprises about 80 to about 95 percent by weight of the specific graphite, and more preferably about 95 percent by weight, with the balance constituted by the binder. Preferably, the anode is prepared from a graphite slurry using polyvinylidene difluoride (PVDF) in a solvent along with the carbon particles. The slurry is coated onto a current collector using conventional application techniques.

The electrolyte used to form a completed cell may comprise any of a number of solvents, such as ethylene carbonate (EC), dimethyl carbonate (DMC), and mixtures thereof. The solvent contains typically a 1 molar solution of a lithium metal salt, such as $LiPF_6$. The positive and negative electrodes are maintained in a separated, spaced apart condition using a fiberglass layer or separator of an equivalent design.

The electrochemical cell which utilizes the positive electrode active material prepared according to the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, for determining capacity of a positive electrode, test cells were fabricated using the lithium metal active material. Accordingly, the cells assembled for testing and the results described hereinbelow are based on the positive electrode active material comprising the lithium manganese oxide of the invention tested against a lithium metal counter-electrode. When forming cells for use as batteries, it is preferred to use a non-metallic intercalation electrode.

Various methods for fabricating electrochemical cells and batteries and for forming electrode components are further described immediately below. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; 4,830,939 (Lee & Shackle); and particularly U.S. Pat. Nos. 5,418,091; 5,456,000; and 5,460,904 assigned to Bell Comm. Research. Each of the above patents is incorporated herein by reference in its entirety.

EXAMPLE

The manganese precursor compound was manganese acetate and the lithium precursor compound was lithium nitrate. Both precursor compounds were in powder form, and 122.2 grams of the manganese acetate and 20 grams of the lithium nitrate powders were mixed and stirred in about 400 milliliters of distilled water. Here, an excess of lithium compound was used based on stoichiometry of the final product. The two powders were essentially dissolved in the water as essentially no particles were found in suspension. The aqueous mixture was then spray-dried to remove a major portion of the water. The aqueous mixture was pumped through a tube and through spray-drying apparatus as shown schematically in FIG. 5. In the spray-dryer 100, a sample 101 is sent from a receptacle to the spray-nozzle 102 by fluid pump 103. Pressurized air from a compressor is controlled by needle valve 104 and is sent to spray-nozzle 102 where it is mixed with the sample at the tip 106 of nozzle 102. Then spray-drying of the sample takes place in the drying chamber 108. In a general process, the solvent precursor (sample) becomes a liquid drop of about 20 microns diameter and has a surface area on the order of 3000 square centimeters per milliliter of sample. The drying gas is sucked through the equipment 100 by aspirator 110 and is heated to the set temperature by heater 112. The hot gas is sucked into the drying chamber to contact the sprayed droplet and dries the sample 101 essentially instantaneously. Since the contact area of the sample in hot gas is very large, on the order of 90 percent or more of the moisture originally present in the sample is vaporized by the hot gas essentially instantly in the drying chamber 108. The spray-dried precursor, is in fine particle form, and is sent to a collector chamber 116. Then the spray-dried particles are separated from the vapor and collected in product container 120. The time for spray-drying varies but the residence time between droplet and particle formation may take seconds or a fraction of a second. In the process, it is typical that each droplet and each particle formed by drying of the droplet is surrounded by vaporized solvent (steam), therefore, the temperature in the vicinity of each fine particle does not rise very much by the heat of vaporization. The process can be conducted at relatively high temperatures on the order of 80° C. or more. If adhesion of the precursor solution to the tip 106 of the nozzle becomes a problem, compressed air may be blown against the tip 106 of the nozzle from a separate gas supply through tube 126.

In this example, the flow rate of the spray-dryer was controlled by adjusting pressure to be about 1 $Kgf/cm^2$. The spray-drying process involved the atomization of the liquid into tiny droplets forming a spray which was then dried by hot argon gas to efficiently evaporate moisture (water, solvent) from the atomized particles. The dried particles were collected and accumulated as fine particle powder. The inlet temperature of the hot argon drying gas was approximately 100° C. The collected powder comprised particles containing the respective precursor manganese and lithium compounds. The resultant collected powder was then heated. The quantity of material heated was about 20 grams. The heating was conducted in an oven at a heating rate of about 5° C. to 20° C. per minute, up to a range of 350° C. to 450° C., where it was held at this temperature for about 30 minutes to 45 minutes. After heating, the product was permitted to cool. The rate of cooling was not considered to be critical and the sample was simply permitted to cool. The final product obtained after heating is a dark, blue-black powder. It is a friable powder of fine particles adhered in a lump or clump. The clump is porous and easily disintegrates into constituent particles of the small size, about 5 microns. Thus, if the clump is touched with very little pressure, it crumbles. The individual particles of the powder are very small, on the order of about 1 to 5 microns. This is the average as measured after crushing the lump and further sonicated in propylene carbonate, then analyzed by a particle size analyzer.

As can be seen, a heating ramp rate of about 20° C. per minute achieves a 400° C. temperature in about 20 minutes. Then the temperature is held for as little as 30 minutes to complete the reaction. This means the product is formed in as little as 50 minutes. Irrespective of the range rate, the reactants are held at the preferred reaction temperature of 350° C. to 400° C. for only 30 to 45 minutes.

The active material $Li_xMn_2O_4$ prepared according to the method of the invention was tested in a cell. The positive electrode, as tested, comprised the active material at 87 percent by weight; acetylene carbon black at 10 percent by weight; and EPDM (ethylene propylene diene monomer) binder at 3 percent by weight. The electrolyte was ethylene carbonate/dimethyl carbonate (EC/DMC) at 1:2 by weight, with fiberglass as its separator and $LiPF_6$ salt was used at the electrolyte. The counter-electrode was metallic lithium. The current density of the test cell was 0.2 milliamps per square centimeter. The test cell is based on 2.4 square centimeter positive electrode. The capacity was determined under constant current cycling at ±0.2 milliamps per square centimeter at the end of every discharge.

TEST RESULTS

FIG. 1 shows the voltage profile versus capacity of a cell comprising a lithium metal anode and the cathode active material prepared according to the invention, $LiMn_2O_4$. The cell was tested under EVS conditions where the conditions are equivalent to very slow cycling regime (normally 50 microamps per square centimeter). The x axis represents the capacity relative to the lithium manganese oxide electrode, or the amount of charge corresponding to the insertion/extraction of lithium. The electrode was prepared according to the Example. The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). FIG. 1 clearly shows and highlights the very high degree of reversibility of the lithium ion reaction of the $Li_xMn_2O_4$ active material prepared according to the invention. The positive electrode showed a performance of 115 milliamp hours per gram on the first discharge.

Figure 2:
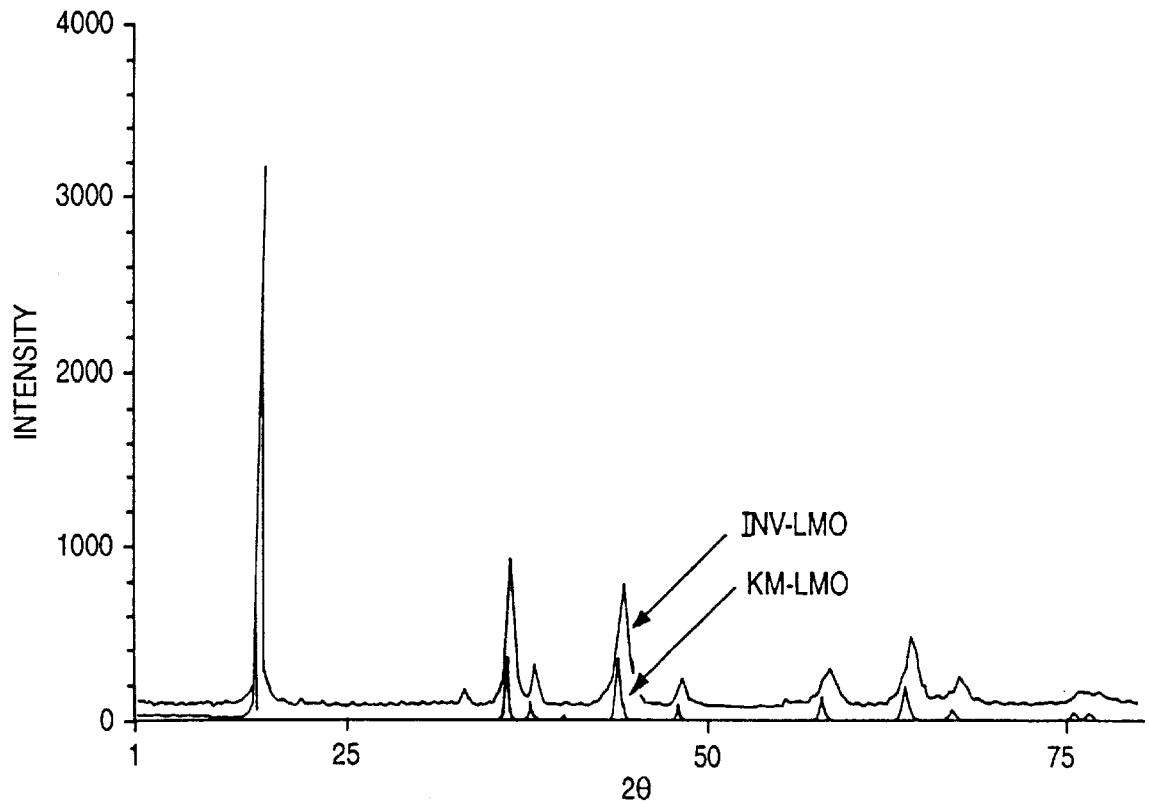
FIG. 2 is a diffractogram showing the results of an x-ray diffraction analysis of the lithium manganese oxide (LMO) compound prepared according to the invention, conducted using CuKa type radiation. The invention LMO is labelled INV-LMO. Also superimposed on FIG. 2 is a diffractogram of a standard lithium manganese oxide formulation obtained from Kerr-McGee, and designated as KM.

FIG. 2 is a diffractogram showing the results of an x-ray diffraction analysis of the nominal $Li_xMn_2O_4$ compound prepared according to the invention conducted using CuKα type radiation. Also superimposed on FIG. 2 is a diffractogram of a standard lithium manganese oxide formulation obtained from Kerr-McGee, and designated as KM. The KM is considered the baseline standard material standard in the industry and prepared by conventional techniques. It is striking that all peaks match. However, the lithium manganese oxide prepared according to the invention shows extra broadening of the peaks indicative of the small particle morphology of this material. The surface area was measured to be 4.8 m²/g. Conventional lithium manganese oxide is less than 1 $m^2/g$, depending on particle size. The diffraction analysis shown for the material of the invention is nearly identical to conventional $Li_1Mn_2O_4$ prepared by conventional means. This indicates that the structure of the lithium manganese oxide material of the invention is similar to and essentially identical to the basic spinel structure of conventional lithium manganese oxide. This is advantageous because the spinel structure is known to reversibly intercalate lithium at a higher rate compared to tetragonal $Li_{1+x}Mn_2O_4$. This result is surprising and unexpected since one would expect that the product of the invention would include a significant amount of unreacted starting material species and/or a two phase product comprising decomposition products of the precursor and/or the substantially amorphous product with little evidence of crystallinity. Such deficiencies are as described in UK Patent No. GB 2,221,213 to Thackery. These deficiencies are not present despite the very low temperature used to prepare the $Li_xMn_2O_4$ product of the present invention. It would have been thought not possible to prepare such a product at such low temperature based on Thackery's prior work.

As can been seen by comparing the two diffractograms of FIG. 2, the product of the invention is essentially the same as conventional $LiMn_2O_4$. The a-axis parameter of the product of the invention is about 8.235 Å. This further demonstrates its similarity to conventional $LiMn_2O_4$ having an a-axis parameter of 8.24 Å, depending on its preparation conditions, quality, and lithium content.

Figure 3:
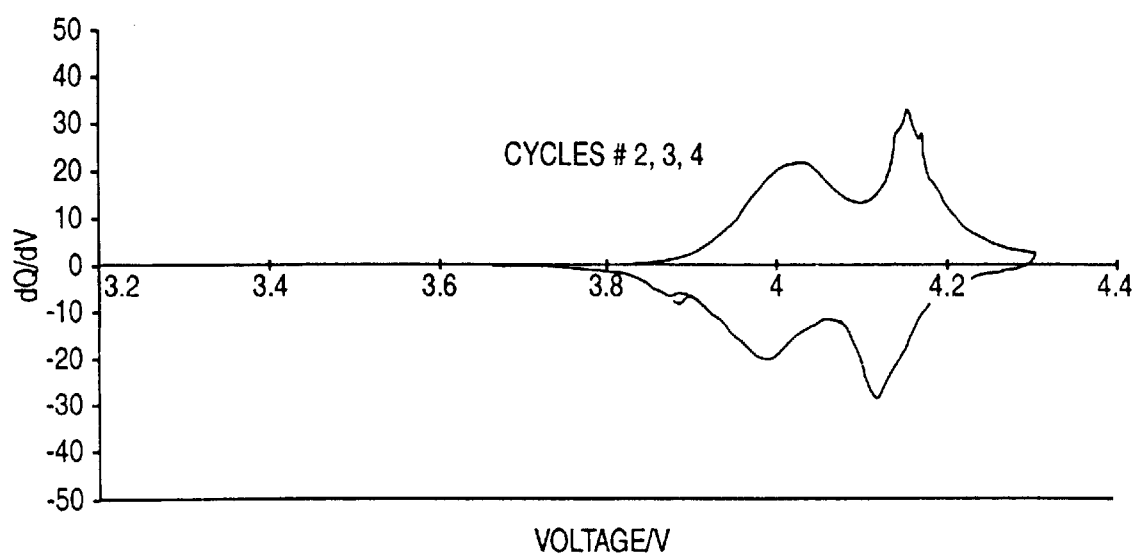
FIG. 3 is a differential capacity plot of FIG. 1, also based on the EVS procedure, and is a derivative of the curve of FIG. 1.

FIG. 3 is an EVS of a differential capacity plot based on FIG. 1. As can be seen from FIG. 3, the material of the invention has high degree of reversibility as per the essentially symmetrical nature of the peaks show reversibility on charge and discharge. Cycles 2, 3, and 4 shown on shown on FIG. 3 contain peaks above the axis (cell charge) which have corresponding peaks below the axis (cell discharge).

Figure 4:
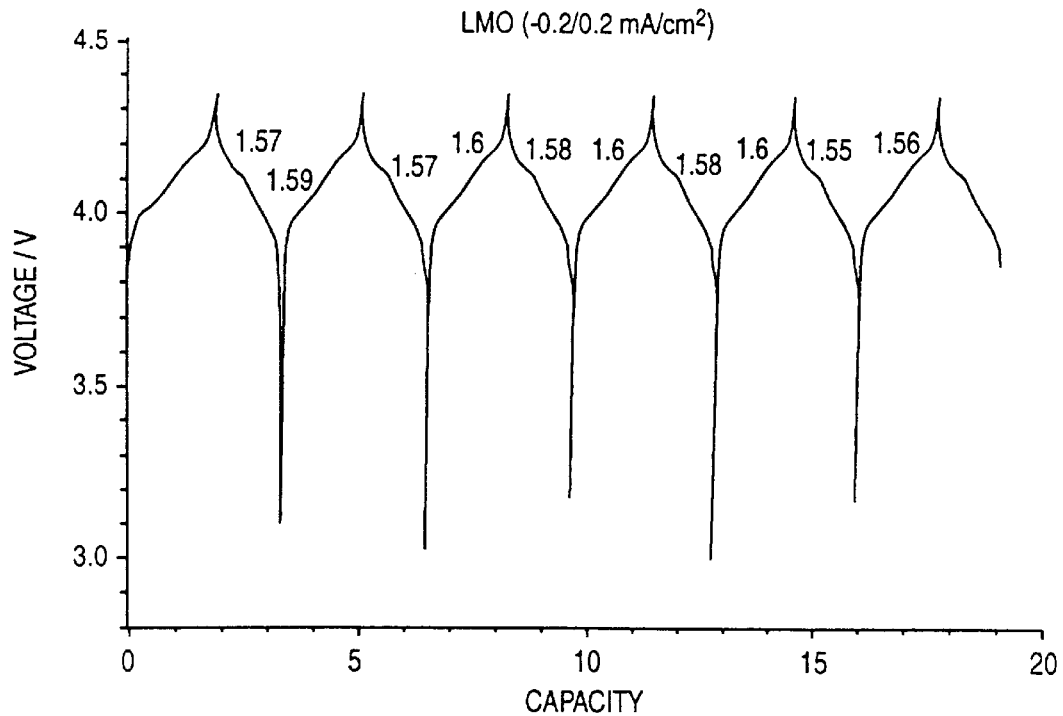
FIG. 4 is a voltage/capacity plot for a cathode having the lithium manganese oxide (LMO) active material prepared according to the invention. The lithium manganese oxide based cathode is cycled against a metallic lithium anode, using constant current cycling at ±0.2 milliamps per square centimeter.

FIG. 4 is a voltage/capacity plot for a cathode having the lithium manganese oxide ($LiMn_2O_4$) active material prepared according to the invention. The lithium manganese oxide based cathode is cycled against a metallic lithium anode, using constant current cycling at ±0.2 milliamps per square centimeter. This constant current cycling at 0.2/0.2 $mA/cm^2$ is versus a lithium metal anode between about 3.0 volts and 4.4 volts. The half cycle capacities are clearly highlighted. Note that after 6 cycles the capacity loss is only about 1.2 percent which is very good. As shown in FIG. 4, during initial charge on the first cycle, lithium ions are deintercalated from the $LiMn_2O_4$. At about 4.3 volts to 4.4 volts about 0.8 to 0.9 atomic unit of lithium has been removed (deintercalation) per formula unit of the original $Li_xMn_2O_4$. This is almost a fully charged condition. The deintercalation is equivalent to about 127 milliamp hours per gram of the total $LiMn_2O_4$ active material. Next, the cell is discharged and a quantity close to 0.8 atomic unit of lithium is reintercalated into the LMO. The reintercalation corresponds to approximately 115 milliamp hours per gram. Importantly, nearly all of the lithium removed from LiMn$_2$O$_4$ on charge has been reintercalated on discharge. The bottom of the curve corresponds to about 3 volts. The cell is then subsequently recharged whereupon a quantity of lithium ions is again deintercalated from LiMn$_2$O$_4$, returning to the region of approximately 4.3 volts. The cell is again discharged and recharged and then the test was terminated after 5 cycles and after nearly completing just under 6 cycles.

Applying the results of FIGS. 1, 3, and 4 to a typical lithium-containing cathode and graphite anode lithium ion cell, the benefits of the present invention can be understood. As can be seen from FIG. 4, after completing nearly 6 cycles, the half cell capacities indicate that only about 1.2 percent capacity is lost, which is very good. This is obtained by comparing the 1.55 milliamp hours after the 5th cycle with initial capacity of 1.57 milliamp hours. The ratio of the two being 0.987. Therefore, it is expected that when this active material is combined with graphite, the performance would be very high when a graphite anode is used, these losses will be even more minimized, as the cycling of a lithium electrode always results in losses due to the inefficiency of lithium as an anode.

While not wishing to be held to any particular theory, it is believed that the invention provides many advantages over a comparative sol-gel reaction from lithium and manganese salt. When an aqueous solution of lithium and manganese salts is prepared, a gel results that is fully embedded in water. It has been found by comparative testing that if the gel is dried by convention means, such as, in an oven, relatively unsatisfactory results occur. However, drying is necessary before the reaction can be effectively conducted at an elevated temperature. It has been found by comparative testing that it is only by means of spray-drying that the fine particle morphology gained from sol-gel reaction is maintained. Such powder morphology is lost if the precursor solution is heated in an oven to drive of f the solvent. This is because with conventional drying, the particles tend to coalesce together and it becomes difficult to break them apart. The spray-drying step of the invention provides the elimination of most of the water without coalescing of particles. In this form, the precursor powder is easily reacted by heating to an elevated temperature with the minimum reaction time of only a few minutes. In the case of the lithium nitrate, it may decompose or melt and then get distributed around the manganese compound particles, just as reaction commences. The acetate compound may decompose and sublime. The decomposition of the precursor acetate eliminates or sublimes volatilizable constituents, leaving behind a relatively porous structure. It is thought that this porous structure causes the advantageous particle size characteristics of the LMO product. This method may be contrasted to that described by Barboux in U.S. Pat. No. 5,135,732. In Barboux it is clear that only at a very high temperature of 600° C. to 800° C. is it possible to obtain an electrochemically viable LiMn$_2$O$_4$ as seen from '732 voltage profiles. In '732 the Li$_1$Mn$_2$O$_4$ on cycling only goes to about Li$_{0.4}$ on deintercalation unless the temperature is 600° C. to 800° C. In Barboux, heating to a high temperature of 600° C. to 800° C. to obtain good electrochemical performance results in a sintering effect and the loss of fine particle morphology, which is detrimental to performance. This performance is not attractive. In contrast, the product of the invention need only be heated to a range of 200° C. to 450° C. and preferably on the order of 450° C. to achieve good electrochemical performance. The Li$_1$Mn$_2$O$_4$ of the invention goes from about Li$_{1.03}$Mn$_{1.97}$O$_4$ to about Li$_{(1.03-0.8)}$Mn$_{1.97}$O$_4$. Thus, the present invention provides much greater capacity utilized from the LMO. This advantage of the invention can be appreciated by reference to FIG. 1 which contains a plot of capacity versus quantity x in Li$_x$Mn$_2$O$_4$. On deintercalation, about 0.8 atomic unit of lithium has been removed, so Li$_1$Mn$_2$O$_4$ goes to Li$_{0.2}$Mn$_2$O$_4$. This removal of 0.8 units of lithium is much greater than that achieved by Barboux, where only 0.6 units lithium is removed from LiMn$_2$O$_4$, resulting in Li$_{0.4}$Mn$_2$O$_4$.

The invention also provides the attractive features of a spray-drying step to obtain intimate mixing of the precursors which results in shorter reaction time at elevated temperature where the elevated temperature is lower than that heretofore thought possible. As a result, for the first time, the invention provides the ability to obtain an LiMn$_2$O$_4$ spinel at a relatively low reaction temperature while retaining beneficial morphology of the starting powder precursor. Advantageously, the invention is flexible and many lithium salts and manganese salts may be used so long as they are soluble in the selected solvent. Carbonates are known to be less soluble in water, which is an effective and inexpensive solvent. The pH of the solution is not critical. It is preferred that it be in the range of 7 to 11 or relatively neutral to alkaline (basic). It is thought that spray-drying is superior to freeze-drying since spray-drying is effectively conducted on a large scale. The heating to an elevated temperature step is flexible. The precursor could be heated at a very fast rate (10° C. to 50° C. per minute) to the desired temperature. Alternatively, the oven could be preheated to 200° C., for example, to sublime all the precursor related volatiles. Microwave heating is an attractive method. It is also possible to conduct heating by rapid thermal anneal (RTA) that produces fast temperature rates on the order of 100° C. or greater per minute and uses infrared radiation (IR).

The method of the invention provides both precursor powder and final LMO compound powder with median particle size less than 100 microns and typically less than 10 microns. Virtually all of the particles, 99 percent by volume have a size less than 10 microns. Only on the order of 2 percent by volume have a size of about 7 microns or larger. About 97 percent by volume have a size less than 7 microns and less than 5 microns. The particle size ranges from 1 to 5 microns for 97 percent of the particles by volume. The particles are relatively uniform in size with 97 percent of the particles in the precursor powder having a size of less than 5 microns. As used herein, "powder" designates matter in a finely divided state. The term "powder" is synonymous with "particulate," "fine particles," and "minute, separate particles," consistent with definitions in Webster's 9th New Collegiate Dictionary, copyright 1989.

The significant advantages of the invention include the ability to attain a highly desirable particle size and a relatively uniform distribution of such particle size. The particle size of a material is very important for electrochemical application. Particle size should be small but not too small as this adversely affects the compacting efficiency as the tapped density becomes smaller. The particle size should not be too large because this adversely affects the diffusion of lithium into the lithium manganese oxide particles. The invention achieves relatively small particles 97 percent by volume having a size less than 5 microns and with a relatively narrow distribution in a range of between 1 and 5 microns. The material obtained by the method of the invention has high rate capability. This is capacity retention as a function of current density, which is greater when a material consists of small particles. The diffusion of lithium into the LMO particles depends on diffusion length and this depends on particle size (maximum dimension) and equivalent diameter of the particle. The bigger the particle, the longer it will take for lithium to diffuse through. However, a fast diffusion is always preferred. If the powder consists of particles of considerably different sizes, each particle will be intercalating and deintercalating lithium at different rates, and this results in a mismatch in the utilization of the material. At a given potential and current, smaller particles will be utilized first and when the upper voltage cut off is obtained, say 4.3 volts for lithium manganese oxide, less lithium is extracted as the bigger particles are not yet fully depleted of lithium because of the slower diffusion out of the larger particles. Therefore, the invention provides, for the first time, an efficient method for making lithium manganese oxide which achieves an optimum particle size and optimum particle size distribution conducive to good rate capability. The method of the invention also advantageously eliminates, or at least reduces, the need for standard milling techniques to reduce particle size. The relatively uniform particle size achieved by the invention is not possible with standard milling techniques.

The significant advantages of the invention may be further understood by contrasting it with the method of Tarascon. In U.S. Pat. No. 5,425,932, Tarascon describes using a precursor lithium salt and $MnO_2$ to from $Li_xMn_2O_4$ similar to Hunter and Nagaura. In Tarascon the precursors are heated in air to a temperature of in excess of about 800° C. for a time sufficient to achieve crystallization. In Tarascon the heating takes place for about 72 hours, or 3 days. Thus, Tarascon's heating time is much greater than Hunter and Nagaura, and is very time consuming. Tarascon also differs from Hunter and Nagaura in that the cooling rate after said heating is strictly controlled. That is, after heating to a temperature in excess of about 800° C., the resultant mixture is cooled to at least about 500° C. at a controlled rate of less than about 10° C. per hour and preferably 2° C. to 3° C. per hour. This means that in order to achieve at least a 300° C. temperature drop at a rate of 10° C. per hour, 30 hours of cooling time are required. At the preferred rate of 2° C. to 3° C. per hour, as described in Tarascon's examples, the 300° C. temperature drop occurs over a period of 100 to 150 hours. Therefore, Tarascon's preferred procedure requires cooling over a period of 4 days to over 6 days. When coupled with the required heating period of time of 3 days, it can be seen that the process for forming lithium manganese oxide according to Tarascon requires a time of over 7 days to over 9 days. The difference between Tarascon's 7 to 9 days process time and the minutes of process time of the present invention are very dramatic. It is clear that the present invention overcomes significant barriers due to severe penalty of time and barriers due to strict process control over such long time periods. The present invention, alone, is readily adaptable to automated commercial production.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A method of making a lithium manganese oxide intercalation compound in powder form, the method comprising the steps of:

forming a solution consisting of manganese acetate, a lithium compound selected from the group consisting of lithium nitrate, lithium hydroxide and lithium carbonate, in water;

spray-drying the solution by atomizing the solution to form droplets thereof, and contacting the droplets with a stream of non-oxidizing hot gas at a first elevated temperature to evaporate at least a major portion by weight of the water present in said solution, thereby providing a powder, wherein said spray-drying is at a temperature of 80° C. to 150° C.; and heating the powder at a second elevated temperature which is greater than said first temperature and is below the melting point of said lithium manganese oxide compound, said second temperature sufficient to cause reaction in said powder, thereby providing said lithium manganese oxide compound having a spinel unit structure.

2. The method according to claim 1 wherein one or both of said first and second temperature is sufficient to sublime acetate.

3. The method according to claim 1 wherein said non-oxidizing hot gas is an inert gas.

4. The method according to claim 1 wherein the gas is an inert gas selected from the group of nitrogen and argon.

5. The method according to claim 1 wherein said spray-drying is conducted to evaporate more than 85 percent by weight of the solvent originally present in the solution.

6. The method according to claim 1 wherein the spray-dried powder comprises particles, 97 percent by volume of said particles having a size of about 5 microns or less.

7. The method according to claim 1 wherein said second elevated reaction temperature is over 200° C., but less than 450° C.

8. The method according to claim 1 wherein said second elevated reaction temperature is about 300° C.

9. The method according to claim 1 wherein the spray-dried powder is heated to said second temperature at a rate of 10° C. to 50° C. per minute to drive the reaction.

10. The method according to claim 9 wherein after said second temperature is achieved, said heating at said second temperature is conducted for a time less than 1 hour.

11. The method according to claim 1 wherein said heating of said powder is conducted for a time less than 2 hours.

12. The method of claim 1 wherein said lithium manganese oxide compound having said spinel unit structure is represented by the formula $Li_xMn_aO_b$ where x is $0.9 \leq x \leq 1.1$, a is $1.9 \leq a \leq 2.1$, and b is $3.9 \leq b \leq 4.1$.

13. A method of making a lithium manganese oxide intercalation compound in powder form characterized by a particle size distribution having 97 percent by volume of the particles with a size in the range of 1 to 5 microns, and having a surface area in a range of 4 to 5 meters square per gram, said lithium manganese oxide intercalation compound having a spinel crystal structure and represented by the formula $Li_xMn_aO_b$ where x is $0.9 \leq x \leq 1.1$, a is $1.9 \leq a \leq 2.1$, and b is $3.9 \leq b \leq 4.1$, said compound further characterized by a capacity loss of less than 5 percent after 5 cycles when cycled against a metallic lithium counter-electrode, said method of making comprising the steps of:

a. forming a solution consisting of manganese acetate and lithium nitrate in water;

b. spray-drying the solution by atomizing the solution to form droplets thereof, and contacting the droplets with a stream of non-oxidizing hot gas at a first elevated temperature to evaporate at least a major portion by weight of the solvent present in said solution, thereby providing a precursor powder, wherein said spray-drying is at a temperature of 80° C. to 150° C.; and c. heating the precursor powder at a second elevated temperature which is greater than said first temperature and is below the melting point of said lithium manganese oxide compound, said second temperature sufficient to cause solid phase reaction among constituents in said precursor powders, thereby providing said lithium manganese oxide compound.

* * * * *